US008645524B2

(12) United States Patent
Pearson et al.

(10) Patent No.: US 8,645,524 B2
(45) Date of Patent: Feb. 4, 2014

(54) TECHNIQUES TO ALLOCATE VIRTUAL NETWORK ADDRESSES

(75) Inventors: Malcolm Pearson, Kirkland, WA (US); Charles McColgan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 11/900,115

(22) Filed: Sep. 10, 2007

(65) Prior Publication Data
US 2009/0070448 A1    Mar. 12, 2009

(51) Int. Cl.
*G06F 15/173* (2006.01)
(52) U.S. Cl.
USPC ........... 709/224; 709/206; 709/246; 370/389; 370/466; 726/15
(58) Field of Classification Search
USPC ........................................................ 709/224
See application file for complete search history.

(56) References Cited

U.S. PATENT DOCUMENTS

| | | | |
|---|---|---|---|
| 6,226,272 B1 * | 5/2001 | Okano et al. | 370/259 |
| 6,351,775 B1 | 2/2002 | Yu | |
| 6,421,732 B1 | 7/2002 | Alkhatib et al. | |
| 6,760,309 B1 | 7/2004 | Rochberger et al. | |
| 7,086,061 B1 | 8/2006 | Joshi et al. | |
| 7,100,070 B2 | 8/2006 | Iwamura et al. | |
| 2002/0184315 A1 * | 12/2002 | Earnest | 709/206 |
| 2004/0078487 A1 | 4/2004 | Cernohous et al. | |
| 2004/0088430 A1 * | 5/2004 | Busi et al. | 709/238 |
| 2004/0107262 A1 * | 6/2004 | Suzuki et al. | 709/207 |
| 2004/0128346 A1 | 7/2004 | Melamed et al. | |
| 2004/0199644 A1 * | 10/2004 | Gass et al. | 709/227 |

(Continued)

OTHER PUBLICATIONS

"Stop Spam Now!", http://john.redmood.com/stopspam.html.
"The Coordinated Spam Reduction Initiative", Date: Feb. 13, 2004, pp. 1-54.

(Continued)

*Primary Examiner* — Krisna Lim
*Assistant Examiner* — Arvin Eskandarnia

(57) ABSTRACT

Techniques to allocate virtual network addresses are described. An apparatus may include a virtual network address management module. The virtual network address management module may be capable of determining an approximate age for a virtual network address, referred to herein as a virtual network address age value. The virtual network address management module may include a virtual network address assignment module, a virtual network address age generator and a message filter module. The virtual network address assignment module may be arranged to assign a virtual network address to a device at a virtual network address assignment time. The virtual network address age generator may be arranged to receive a message arrival time for a message with the virtual network address, and determine a virtual network address age value for the virtual network address with the virtual network address assignment time and the message arrival time. The message filter module may be arranged to determine whether to send the message to the device based on the virtual network address age value. Other embodiments are described and claimed.

20 Claims, 4 Drawing Sheets

(56) References Cited

U.S. PATENT DOCUMENTS

| | | | |
|---|---|---|---|
| 2005/0213560 A1* | 9/2005 | Duvvury | 370/351 |
| 2007/0022195 A1 | 1/2007 | Kawano et al. | |
| 2007/0038755 A1 | 2/2007 | Sullivan et al. | |
| 2007/0083913 A1 | 4/2007 | Griffin et al. | |
| 2007/0253414 A1* | 11/2007 | Meyer et al. | 370/389 |
| 2008/0072312 A1* | 3/2008 | Takeyoshi et al. | 726/15 |
| 2008/0189372 A1* | 8/2008 | Solberg et al. | 709/206 |
| 2009/0116499 A1* | 5/2009 | Kokado | 370/401 |

OTHER PUBLICATIONS

Faaborg Alexander, "Implementing a Usenet Style Interface on Top of the Gnutella Network", Date: May 10, 2002.

Undheim Gard, "Predicting Performance and Scaling Behaviour in a Data Center with Multiple Application Servers", Date: May 21, 2006, pp. 1-80.

* cited by examiner

TECHNIQUES TO ALLOCATE VIRTUAL NETWORK ADDRESSES

BACKGROUND

Communication networks are designed to communicate information between various end points or destinations, such as various computing devices. In many cases, the communicated information is in the form of discrete messages, such as electronic mail (e-mail) messages, text messages, instant messages, chat messages, short message service (SMS) messages, multimedia message service (MMS) messages, and so forth. The speed, breadth, openness and convenience of messaging services, however, also allows for the potential abuse of electronic messaging systems to indiscriminately send unsolicited bulk messages, a technique sometimes colloquially referred to as "spamming." There are many types of spamming, and one of the more recognized forms of spam is e-mail spam. E-mail spam, also known as bulk or junk e-mail, involves sending nearly identical (or with similar content, but perhaps very different representations generated automatically) messages to numerous recipients by e-mail. Multiple forms of the content are generated in an effort to defeat efforts to block the content. Common synonyms for e-mail spam is unsolicited bulk e-mail (UBE) or unsolicited commercial e-mail (UCE). Spamming in general, and e-mail spam in particular, is undesirable for many reasons, not the least of which is that a spammer typically sends e-mail spam with criminal intent to perform some form of fraud. Furthermore, e-mail spam also distracts from the quality of the conversation channel, and frequently involves forgery of the e-mail source. Consequently, there may be a need for improved techniques to reduce or prevent the communication of unsolicited messages in a communications network.

SUMMARY

Various embodiments may be generally directed to a communications network. Some embodiments may be particularly directed to techniques for allocating or assigning virtual network addresses, including virtual network addresses, to various computing devices within a communications network. The virtual network addresses may be assigned in a manner that allows an electronic messaging system to quickly determine how long a given virtual network address has been in use by calculating a virtual network address age value for the virtual network address. This allows the electronic messaging system to determine whether a message with the virtual network address is from a legitimate source or a malicious source based on the virtual network address age value, and route or filter the message accordingly.

In one embodiment, for example, an apparatus may comprise a virtual network address management module. The virtual network address management module may be capable of determining an approximate age for a virtual network address, referred to herein as a virtual network address age value. The virtual network address management module may include a virtual network address assignment module, a virtual network address age generator and a message filter module. The virtual network address assignment module may be arranged to assign a virtual network address to a device at a virtual network address assignment time. The virtual network address age generator may be arranged to receive a message arrival time for a message with the virtual network address, and determine a virtual network address age value for the virtual network address with the virtual network address assignment time and the message arrival time. The message filter module may be arranged to determine whether to send the message to the device based on the virtual network address age value. In this manner, the virtual network address management module may allow an electronic messaging system to dynamically handle message spam (e.g., quarantine, deliver, delete, and so forth) and potentially reduce an amount of message spam communicated within a communication network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
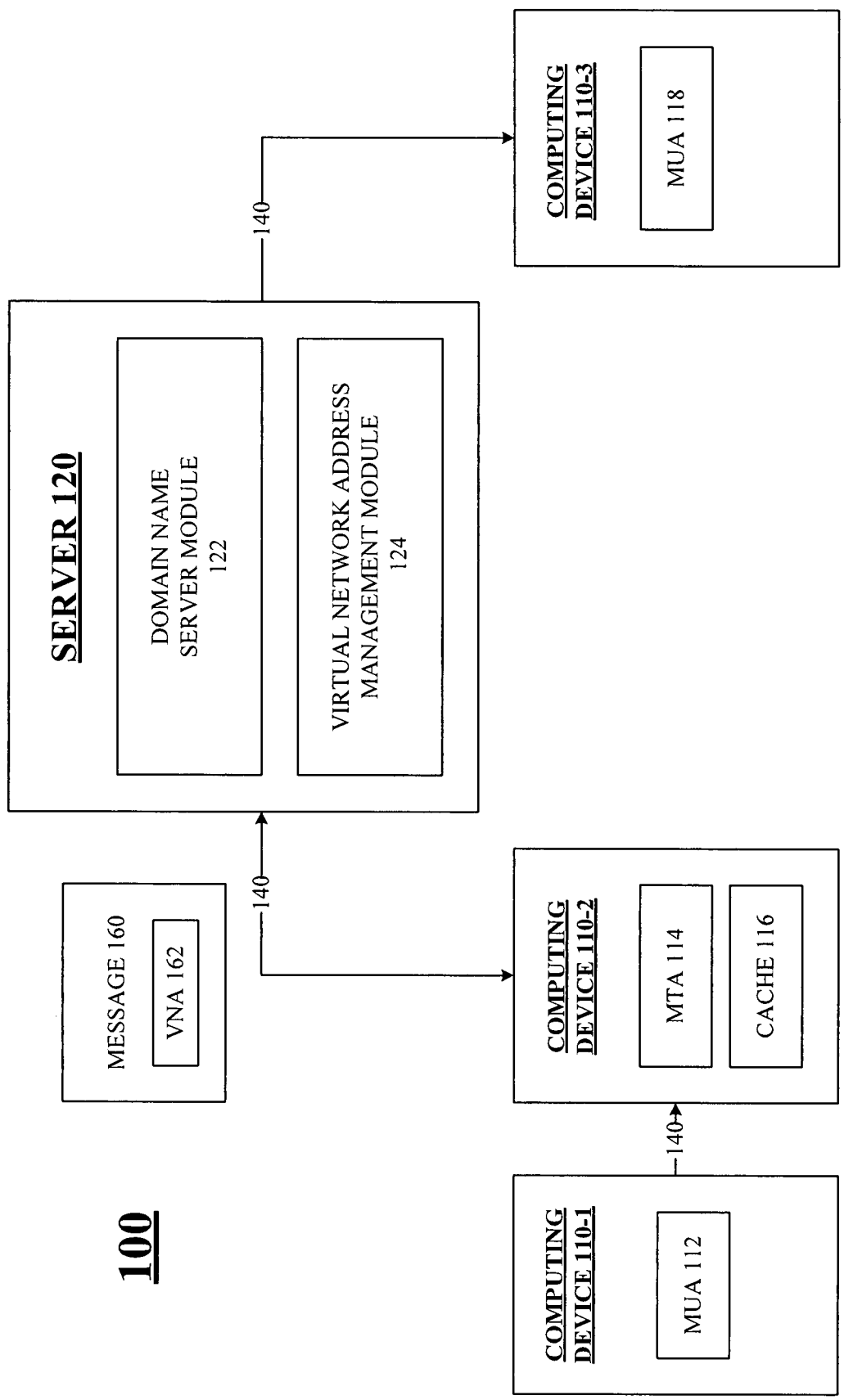
FIG. 1 illustrates one embodiment of a communication system.

Various embodiments may be directed to a virtual network address allocation and filter scheme for a communications network. The virtual network address allocation and filter scheme may be designed to allocate virtual network addresses to one or more communication devices within a communications network. A virtual network address may comprise a network address that does not directly correspond to a specific computing device or network interface on a computing device. The virtual network address may be used for any number of reasons, such as providing connection redundancy, security features, routing flexibility, and so forth. In some cases, for example, multiple devices or machines may use a single virtual address. The virtual network address may be translated into a physical network address for a computing device in order to route information to the computing device.

More particularly, a virtual network address allocation and filter scheme may be used to allocate virtual network addresses in a manner that allows determination of how long a given virtual network address has been in use within a communications system. When a message with a virtual network address is received by an electronic messaging system, the electronic messaging system may determine or calculate a virtual network address assignment time for the virtual network address. The virtual network address assignment time may be determined in a number of different ways as described in more detail below. In some cases, the virtual network address assignment time may also be augmented, or replaced, by a virtual network address not-published time or a virtual network address invalid time as described further below. The virtual network address assignment time may be compared to a message arrival time. The message arrival time may represent a time when a message with a virtual network address is actually received by an electronic mail system, or alternatively, potentially when a resolver sends a Domain Name System (DNS) resolution request to a DNS server requesting a resource record for a given domain name and corresponding virtual network address for the domain name. In the latter case, however, both legitimate and potentially fraudulent senders will pick up the virtual network address from the DNS server, therefore making this implementation less efficient. Comparing the virtual network address assignment time with the message arrival time derives an approximate virtual network address age value for a given virtual network address.

In various embodiments, an electronic messaging system may use the approximate virtual network address age value to determine whether a communication message with a virtual network address is from a legitimate source or a malicious source. For example, the virtual network address age value may be compared to some threshold value, such as a Time To Live (TTL) value corresponding to the virtual network address as assigned by a DNS server. If the virtual network address age value is less than the TTL value, then the virtual network address is valid and likely from a legitimate source. If the virtual network address age value is greater than the TTL value, however, then the virtual network address is expired and likely from a malicious source.

The communications device can then perform filtering operations based on the comparison results to determine whether to forward the communication message to its intended destination. For example, if the communication message is identified as message spam based on the virtual network address age value used by the communication message, then the communication device may handle the message spam according to various defined rules, such as discarding the message spam, routing the message spam to another device or system for analysis or collecting statistics, marking the message spam, tracking the message spam, and so forth. In this manner, the communication of message spam within a communications network may be substantially reduced.

FIG. 1 illustrates one embodiment of a communications system 100. The communications system 100 may represent a general system architecture suitable for implementing various embodiments. The communications system 100 may comprise multiple elements. An element may comprise any physical or logical structure arranged to perform certain operations. Each element may be implemented as a hardware element, a software element, or any combination thereof, as desired for a given set of design parameters or performance constraints. Examples of hardware elements may include without limitation devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include without limitation any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although the communications system 100 as shown in FIG. 1 has a limited number of elements in a certain topology, it may be appreciated that the communications system 100 may include more or less elements in alternate topologies as desired for a given implementation. The embodiments are not limited in this context.

As shown in the illustrated embodiment of FIG. 1, the communications system 100 may comprise various computing devices 110-1-$p$ and a server 120 (e.g., the server 120 may also comprise a computing device). The computing devices 110-1-$p$ may comprise part of a public network and/or a private network. A public network may comprise any network accessible to a general class of users without discrimination. An example of the public network may include the Internet. A private network may comprise any network accessible to a limited class of users with discrimination between users and controlled access. An example of the private network may include a network for a business entity, such as an enterprise network. The server 120 may be implemented as a part of a public network or a private network as well depending on the type or class of clients serviced by the server 120. In some cases, certain network elements or devices may bridge communications between the public and the private network. In such cases, these network elements or devices can be arranged to perform the translation of the virtual network address to the physical address of an individual machine.

In various embodiments, the communications system 100 may include packet-switched networks capable of supporting various types of messaging communications between various network devices. The messaging communications may include without limitation e-mail messages, text messages, instant messages, chat messages, short message service (SMS) messages, multimedia message service (MMS) messages, and so forth. Further, the packet-switched networks may implement various data-oriented protocols, such as one or more protocols from the Internet suite of protocols as defined and promulgated by the Internet Engineering Task Force (IETF) standards organization.

In various embodiments, the computing devices 110-1-$p$ may each comprise or be implemented as a part, component or sub-system of an electronic device having a network address. Examples for electronic devices suitable for use as the computing devices 110-1-$p$ may include without limitation a processing system, computer, server, work station, appliance, terminal, personal computer, laptop, ultra-laptop, handheld computer, personal digital assistant, television, digital television, set top box, telephone, mobile telephone, cellular telephone, handset, wireless access point, base station, subscriber station, mobile subscriber center, radio network controller, conference system, router, hub, gateway, bridge, switch, machine, or combination thereof. A more detailed example for the computing devices 110-2, 110-3 may be described with reference to FIG. 4.

In various embodiments, the communications system 100 may include the server 120. In some embodiments, the server 120 may be implemented as an electronic messaging system to manage message communications on behalf of a given client, such as the computing device 110-3. Examples of electronic messaging systems may include any messaging system arranged to communicate various types of messages between multiple end points, such as the computing devices 110-1-$p$. In one embodiment, for example, the server 120 may be implemented as an electronic messaging system suitable for communicating e-mail messages. In this context, the server 120 may be implemented as a mail transfer agent (MTA), a mail transport agent, a message transfer agent, a mail server, a mail exchanger, a unified messaging system, and so forth. In one embodiment, for example, the server 120 may be implemented as a MICROSOFT® EXCHANGE HOSTED SERVICES SERVER, made by Microsoft Corporation, Redmond, Wash.

As shown in the illustrated embodiment of FIG. 1, the server 120 includes a DNS module 122 and a virtual network address management module (VNAMM) 124. Although the illustrated embodiment shown in FIG. 1 includes a single server 120 with the modules 122, 124 for purposes of clarity, it may be appreciated that the Exchange Hosted Services offered by the server 120 may be implemented using an array of servers at one or more data centers. In the latter case, the server arrays and data centers may include other equipment, including load balancers, network appliances, and other network devices that may perform some or all of the functions described with reference to the server 120. For example, a data center may comprise multiple DNS servers that may perform operations described with reference to the DNS module 122, and a Global Server Load Balancing (GSLB) system to perform operations described with reference to the VNAMM 124. The specific implementation of the principles described herein may vary in accordance with a given set of performance goals and design constraints. The embodiments are not limited in this context.

In various embodiments, the computing devices 110-1-$p$ may each comprise various software and/or hardware message components to communicate electronic messages between each other and the server 120. For example, the computing devices 110-1, 110-3 may be arranged to originate and terminate messages. In the context of an e-mail message, the computing devices 110-1, 110-3 may each include mail user agent (MUA) modules 112, 118. The MUA modules 112, 118 are computer programs or software agents that allow a user or operator to create, send, receive or display electronic mail messages from one computer to another. Although the computing devices 110-1, 110-3 are shown with the respective MUA modules 112, 118, it may be appreciated that the computing devices 110-1, 110-3 may further include other messaging components, such as a mail submission agent (MSA) or a mail transfer agent (MTA) to transfer e-mail messages from other machines.

To implement e-mail operations, for example, the MUA modules 112, 118 may be implemented as a MICROSOFT® OFFICE OUTLOOK e-mail client, made by Microsoft Corporation, Redmond, Wash. To implement other messaging operations, for example, the MUA modules 112, 118 may be implemented as a MICROSOFT OFFICE COMMUNICATOR client. The MICROSOFT OFFICE COMMUNICATOR client is an integrated enterprise communications client, enabling information workers to communicate in real time through the use of instant messaging (IM), VoIP and video-conferencing. The MICROSOFT OFFICE COMMUNICATOR is typically not used as a standalone application, however, and is arranged to interact with the server 120 implemented as a MICROSOFT OFFICE COMMUNICATIONS SERVER.

An operator may generate a message 160 using the MUA module 112 for a given destination. An operator may input a network address for the message 160, typically in the form of a user name and domain name, such as "user@microsoft.com," and enter the content into the body of the message 160. The network address may represent a user for the computing device 110-3. Once the operator completes the message 160, the MUA module 112 may forward the message 160 along a path 140 to the intended destination, such as the MUA module 118 of the computing device 110-3.

Along the message path 140, there may be one or more intermediate devices to assist in relaying the message 160 from the computing device 110-1 to the computing device 110-3. In one embodiment, for example, the message path 140 may include a computing device 110-2. The computing device 110-2 may be arranged to relay or transfer messages, such as the message 160 received from the computing device 110-1. The computing device 110-2 may include a message transfer agent in the form of a Mail Transfer Agent (MTA) module 112. The MTA module 114 is a computer program or software agent that transfers electronic mail messages from one computer to another. It typically receives messages from another MTA to perform mail relay operations, a MSA that itself got the mail from a MNA, or directly from an MUA, thus acting as an MSA itself. The MTA module 114 works behind the scenes, while the user usually interacts with the MUA modules 112, 118. Although the computing device 110-2 is shown with a MTA module 114, it may be appreciated that the computing device 110-2 may further include a MSA and/or MUA to send or receive e-mail messages as well.

The use of messaging agents throughout the message path 140 leads to a fairly efficient mechanism for communicating messages between operators of the computing devices 110-1-$p$. The speed and convenience of such messaging services, however, also allows for the potential abuse of electronic messaging systems to indiscriminately send unsolicited bulk messages or message spam. For example, a spammer typically sends spam with criminal intent to perform some form of fraud. To prevent detection and reduce costs, a spammer routinely attempts to compromise another computer to perform malicious tasks under remote detection. A compromised computer is sometimes referred to as a "zombie" or software robot ("bot"), with a group of bots forming a "botnet." A bot controller may remotely instruct one or more bots to send message spam to other computers on a network using network addresses of the compromised computers. Since the network addresses are legitimate network addresses, it becomes difficult to differentiate between legitimate communication messages and message spam based on a given source network address. Consequently, there may be a need for improved techniques to reduce or prevent the communication of unsolicited messages in a communications network.

To solve these and other problems, the communications system 100 may utilize an electronic messaging system (e.g., the server 120) that implements a unique virtual network address allocation and filter scheme to allocate or assign virtual network addresses to the various communication devices within a given network, such as an enterprise network. A virtual network address may comprise a network address that does not directly correspond to a specific computing device or network interface on a computing device. The virtual network address may be used by an enterprise network for any number of reasons, such as providing connection redundancy, security features, routing flexibility, and so forth. The virtual network address may be translated into a physical network address for a computing device in order to route information to the computing device. The virtual network address allocation and filter scheme may allow certain communication devices, such as the server 120, to filter communication messages based on an age for the assigned virtual network addresses.

Typically the allocated virtual network address has a limit on the period of time it can remain in use by a given device. For example, a DNS server may associate various sorts of information with a domain name, and translate a human-readable domain name into a network address, such as an Internet Protocol (IP) address. In some cases, the network address may comprise a virtual network address. The DNS server may also assign a time domain parameter such as a Time To Live (TTL) value to the virtual network address. The TTL value defines a limit on the period of time that a resource record with the virtual network address can be cached on a host system prior to becoming invalid or expired. Since a compromised computer such as a zombie or a bot attempts to exploit captured and legitimate e-mail addresses for as long as possible, the compromised computer may utilize a virtual network address to send message spam beyond the time period indicated by the TTL value. In some cases, however, it may be difficult for an electronic messaging system to determine whether a given communication message includes a virtual network address with an expired TTL value. Various embodiments implement a virtual network address allocation and filter scheme to assist an electronic messaging system in making such a determination. In one embodiment, for example, the virtual network address allocation and filter scheme may be implemented by the VNAMM 124 of the server 120 as described in more detail with reference to FIG. 2.

Figure 2:
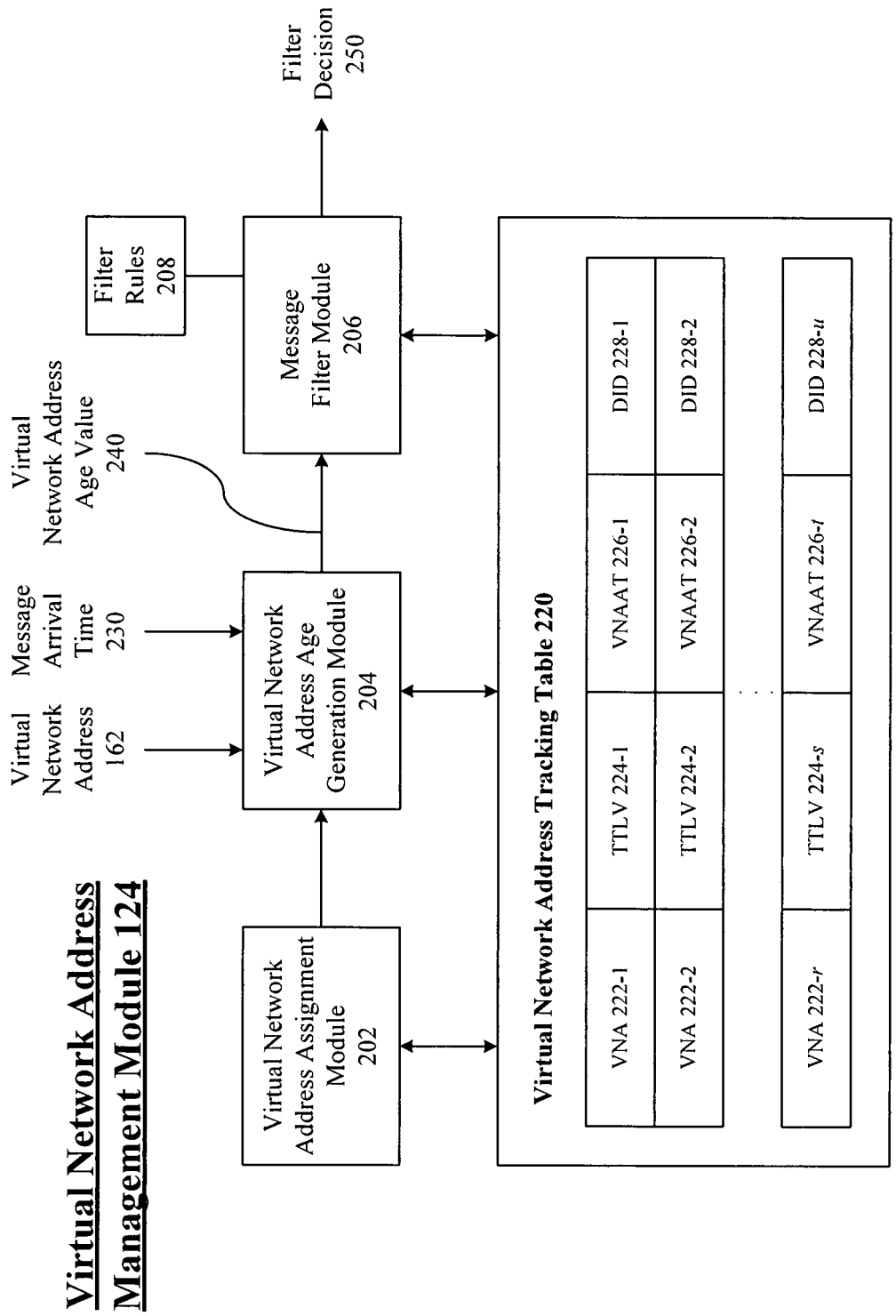
FIG. 2 illustrates one embodiment of a virtual network address management module.

FIG. 2 illustrates a more detailed block diagram for the VNAMM 124. The VNAMM 124 may be capable of determining an approximate age for a virtual network address (VNA) 222-1-$r$, as represented by a virtual network address age value (VNAAV) 240. The VNAMM 124 may include, among other software components, a virtual network address assignment module (VNAAM) 202, a virtual network address age generator (VNAAG) 204, and a message filter module 206.

The VNAAM 202 may be arranged to assign a VNA 222-1-$r$ to a network device serviced by the server 120. For example, assume the computing device 110-3 is part of an enterprise network serviced by a global data center represented by the server 120. The VNAAM 202 may temporarily allocate or assign a VNA 222-1-$r$ to various network devices within the enterprise network, as represented by the computing device 110-3. The VNAAM 202 may store the assigned VNA 222-1-$r$ in a virtual network address tracking table (VNATT) 220, along with other associated information. For example, the VNAAM 202 may store a device identifier (DID) 228-1-$u$ for each network device assigned a VNA 222-1-$r$ in the VNATT 220. The DID 228-1-$u$ may comprise, for example, a physical address, a hardware address, a media access control (MAC) address, a globally unique identifier (GUID) and so forth. The VNAAM 202 may also store a virtual network address assignment time (VNAAT) 226-1-$t$ in the VNATT 220 representing when the VNA 222-1-$r$ was assigned to the network device. The VNAAM 202 may further store a TTL value (TTLV) 224-1-$s$ in the VNATT 220 representing a TTL value assigned by a DNS server as represented by the DNS module 122. It may be appreciated that other relevant information may be stored with the VNA 222-1-$r$ using the VNATT 220 as desired for a given implementation.

The VNAAM 202 may allocate or assign the VNA 222-1-$r$ in a manner that allows the VNAMM 124 of the server 120 to instantaneously determine how long a given VNA 222-1-$r$ has been in use within the communications system 100 by calculating a VNAAV 240 for the VNA 222-1-$r$. The VNAAM 202 may store a VNAAT 226-1-$t$ in the VNATT 220 representing when the VNA 222-1-$r$ was explicitly or approximately assigned to a given network device. The VNAAG 204 may then derive the VNAAV 240 using the VNAAT 226-1-$t$.

In another example, the VNAAM 202 may segment the VNA 222-1-$r$ into separate blocks, and rotate allocation or assignment of individual VNA 222-1-$r$ within each block on a timed basis in accordance with a virtual network address rotation value. The VNAAG 204 may then derive a VNAAT 226-1-$t$ for a VNG 222-1-$r$ using a virtual network address block number for the VNA 222-1-$r$ and the virtual network address rotation value. The calculated VNAAT 226-1-$t$ may then be used to derive the VNAAV 240. The latter technique may provide less granularity and preciseness relative to recording and using an explicitly recorded VNAAT 226-1-$t$ for each assigned VNA 222-1-$r$, although it will potentially consume less memory at the cost of increased processing cycles.

In some cases, the virtual network address assignment time may also be augmented, or replaced, by a virtual network address not-published time or a virtual network address invalid time. For example, when using a block of virtual addresses, the virtual network address rotation value may be used to determine when a virtual network address should no longer be published or is invalid. In this case, the VNAAG 204 may determine whether a given virtual network address is invalid without necessarily having to compute the VNAAT 226-1-$t$ or VNAAV 240. For example, a flag or variable may be set to indicate whether a given VNA 222-1-$r$ is valid or invalid at any given point in time, and the VNAAG 204 and the message filter 206 may check the current state of the flag for a the VNA 222-1-$r$ to determine a respective age or filter option for the VNA 222-1-$r$. It may be appreciated that other time measurement techniques and values may be implemented by the VNAAM 202 as well in order to accomplish the design parameters and performance goals as described herein.

The VNAAG 204 may be arranged to determine an explicit or approximate VNAAV 240 for a given VNA 222-1-$r$ received from a message, such as the message 160. The VNAAG 204 may receive as inputs a message arrival time 230 for the message 160, and a VNA 162 from the message 160 that corresponds to one of the VNA 222-1-$r$. For example, the VNAAG 204 may search the VNATT 220 using the VNA 162 to find a corresponding VNA 222-1-$r$, and either calculate or retrieve the corresponding VNAAT 226-1-$t$ depending on the particular assignment technique implemented for the VNAAM 202. The message arrival time 230 may represent a time when the message 160 with the VNA 162 is actually received by the server 120. Alternatively, the message arrival time 230 may represent a time when a resolver sends a DNS resolution request to the DNS module 122 requesting a resource record for a given domain name and corresponding VNA for the domain name. In either case, the VNAAG 204 may determine a VNAAV 240 for the VNA 162 with the VNAAT 226-1-$t$ and the message arrival time 230, and output the VNAAV 240 to the message filter 206.

The message filter 206 may be arranged to determine whether the message 160 with the VNA 162 is from a legitimate source or a malicious source based on the VNAAV 240, and route or filter the message 162 accordingly. The message filter 206 may receive the VNAAV 240 from the VNAAG 204, and determine whether to send or forward the message 160 to the computing device 110-3 based on the VNAAV 240. The message filter 206 may have a set of filter rules 208 to cause the message filter 206 to implement any desired set of rule-based operations. For example, the VNAAV 240 may be compared to some threshold value, such as a TTLV 224-1-$s$ corresponding to the VNA 222-1-$r$ as assigned by the DNS module 122. If the VNAAV 240 is less than the TTLV 224-1-$s$, then the VNA 222-1-$r$ may be considered valid and likely from a legitimate source. If the VNAAV 240 is greater than the TTLV 224-1-$s$, however, then the VNA 222-1-$r$ is considered expired and likely from a malicious source.

If the message 160 is identified as message spam based on the VNAAV 240 for the VNA 162 used by the message 160, then the server 120 may handle the message spam according to various defined rules from the filter rules 208. For example, the message filter module 206 may discard the message spam, route the message spam to another device or system for analysis or collecting statistics, mark and forward the message spam, track the message spam, forward the message spam, place the message in an archive of spam and so forth. In this manner, the VNAMM 124 may allow the server 120 to filter any messages serviced by the server 120, thereby reducing an amount of message spam communicated within the communication system 100.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints. Other anti-spam activities may be interspersed into these operations.

Figure 3:
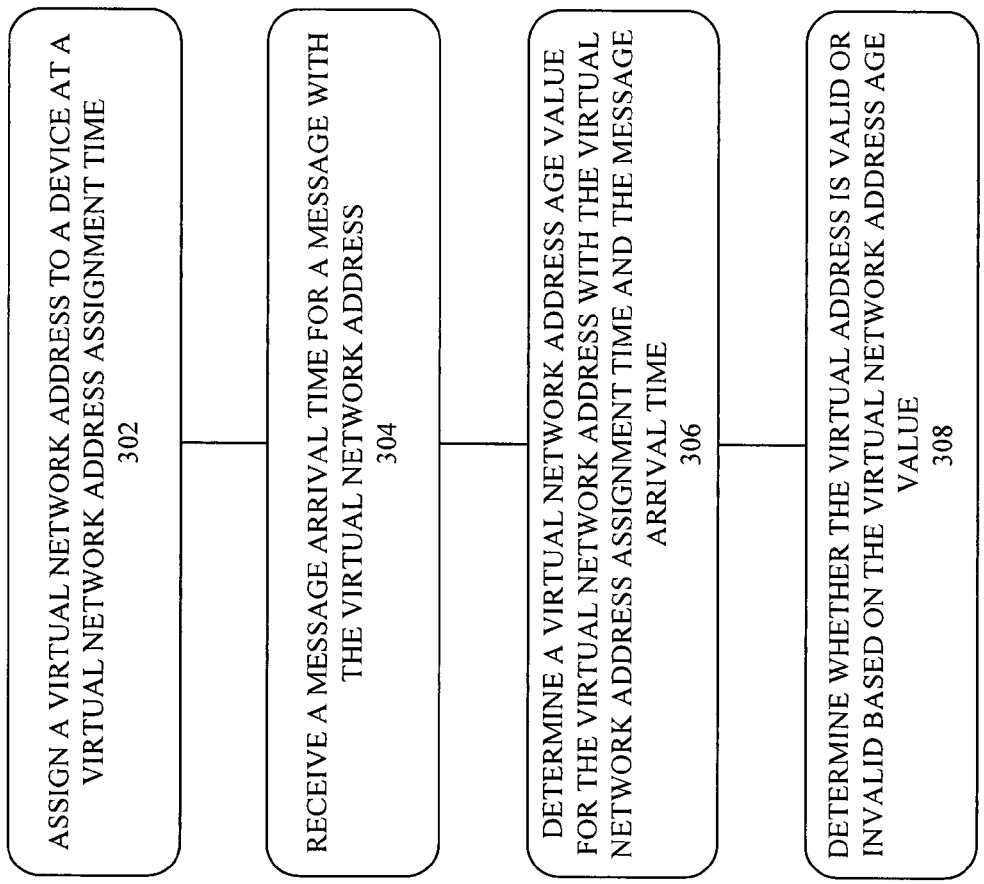
FIG. 3 illustrates one embodiment of a logic flow

FIG. 3 illustrates a logic flow 300. The logic flow 300 may be representative of the operations executed by one or more embodiments described herein. As shown in FIG. 3, the logic flow 300 may assign a virtual network address to a device at a virtual network address assignment time at block 302. The logic flow 300 may receive a message arrival time for a message with the virtual network address at block 304. The logic flow 300 may determine a virtual network address age value for the virtual network address with the virtual network address assignment time and the message arrival time at block 306. The logic flow 300 may determine whether the virtual address is valid or invalid based on the virtual network address age value at block 308. The embodiments are not limited in this context.

In one embodiment, the logic flow 300 may assign a virtual network address to a device at a virtual network address assignment time at block 302. For example, the VNAAM 202 of the VNAMM 124 of the server 120 may assign a given VNA 222-1-*r* to the computing device 110-3 as represented by a DID 228-1-*u* at a given VNAAT 226-1-*t*. The VNAAT 226-1-*t* may be explicit as measured by a timer. The VNAAT 226-1-*t* may also be derived by having the VNAAM 202 assign the VNA 222-1-*r* to the computing device 110-3 from a certain block of virtual network addresses in accordance with a virtual network address rotation value, and calculating the VNAAT 226-1-*t* from a virtual network address block number and the virtual network address rotation value. The VNAAM 202 may store the assigned VNA 222-1-*r*, a TTLV 224-1-*s* corresponding to the assigned VNA 222-1-*r*, and the VNAAT 226-1-*t* in the VNATT 220. In some cases, the VNAAM 202 may also store the DID 228-1-*u* in the VNATT 220 as well to facilitate VNATT 220 searches.

In one embodiment, the logic flow 300 may receive a message arrival time for a message with the virtual network address at block 304. For example, the VNAAG 204 may receive a message arrival time 230 for the message 160 with the VNA 162. The message arrival time 230 may represent a time when the message 160 is received by the server 120, or alternatively, when a resolver (e.g., from the computing device 110-2) sends a DNS resolution request to the DNS module 122 requesting a resource record for a given domain name and corresponding VNA 162 for the domain name in anticipation of performing a message transfer of the message 160.

In one embodiment, the logic flow 300 may determine a virtual network address age value for the virtual network address with the virtual network address assignment time and the message arrival time at block 306. For example, the VNAAG 204 may receive as inputs a message arrival time 230 for the message 160, and a VNA 162 from the message 160 that corresponds to one of the VNA 222-1-*r*. The VNAAG 204 may search the VNATT 220 using the VNA 162 to find a corresponding VNA 222-1-*r*, and either calculate or retrieve the corresponding VNAAT 226-1-*t* depending on the particular assignment technique implemented for the VNAAM 202. The VNAAG 204 may determine a VNAAV 240 for the VNA 162 with the VNAAT 226-1-*t* and the message arrival time 230, and output the VNAAV 240 to the message filter 206.

In one embodiment, the logic flow 300 may determine whether the virtual address is valid or invalid based on the virtual network address age value at block 308 For example, the VNAAG 204 may place a particular VNA 222-1-*r* in use with a limited TTLV 224-1-*s*. At some point, the VNAAG 204 stops offering the assigned VNA 222-1-*r* when the TTLV 224-1-*s* expires. In some cases, an error buffer may be added to the TTLV 224-1-*s*, such as follows:

$T \text{invalid} = T \text{notPublishedAnyMore} + k * TTL$; or $T \text{invalid} = T \text{notPublishedAnyMore} + k + TTL$)

Prior to the TTLV 224-1-*s* expiring, or the TTLV 224-1-*s* plus some threshold value from the error buffer expiring, the message filter module 206 can consider the VNA 222-1-*r* valid. When the TTLV 224-1-*s* expires, or the TTLV 224-1-*s* plus some threshold value from the error buffer expires, the message filter module 206 can consider the VNA 222-1-*r* invalid.

Once the message filter module 206 determines whether the VNA 222-1-*r* is valid or invalid, the message filter 206 may process the message with the VNA 222-1-*r* accordingly. For example, the message filter module 206 may be arranged to send the message to the device when the virtual address is valid. In this case, the message filter module 206 may retrieve a TTLV 224-1-*s* corresponding to the VNA 162, 222-1-*r* of the message 160. The message filter module 206 may send the message 160 to the computing device 110-3 when the VNAAV 240 is less than the TTLV 224-1-*s* corresponding to the VNA 162, 222-1-*r*. In another example, the message filter module 206 may be arranged to process the message based on a set of filter rules when the virtual address is invalid. The message filter module 206 may perform various message mitigation operations for the message 160 implemented by a set of filter or policy rules when the VNAAV 240 is greater than the appropriate TTLV 224-1-*s*. For example, the message mitigation operations may include routing the message 160 to a different server or network element, deleting the message 160, delivering the message 160, placing the message 160 in a quarantine, performing security or virus scanning operations for the message 160, performing statistical or quantitative tracking and analysis of the message 160, and so forth. The particular message mitigation operations may vary as desired for a given implementation.

In some cases, the message filter module 206 may discard the message 160 when the VNAAV 240 is greater than the appropriate TTLV 224-1-*s* by some threshold value. The threshold value may be set to bias whether the message 160 is forwarded to the computing device 110-3. For example, a larger threshold value will cause the message filter module 206 to forward the message 160 to the computing device 110-3 even when the VNAAV 240 comparison operations indicates that the VNA 162, 222-1-*r* is expired by some amount of time, thereby reflecting a bias towards more relaxed filtering rules to ensure a greater likelihood that messages reach the computing device 110-3 and are not discarded.

Figure 4:
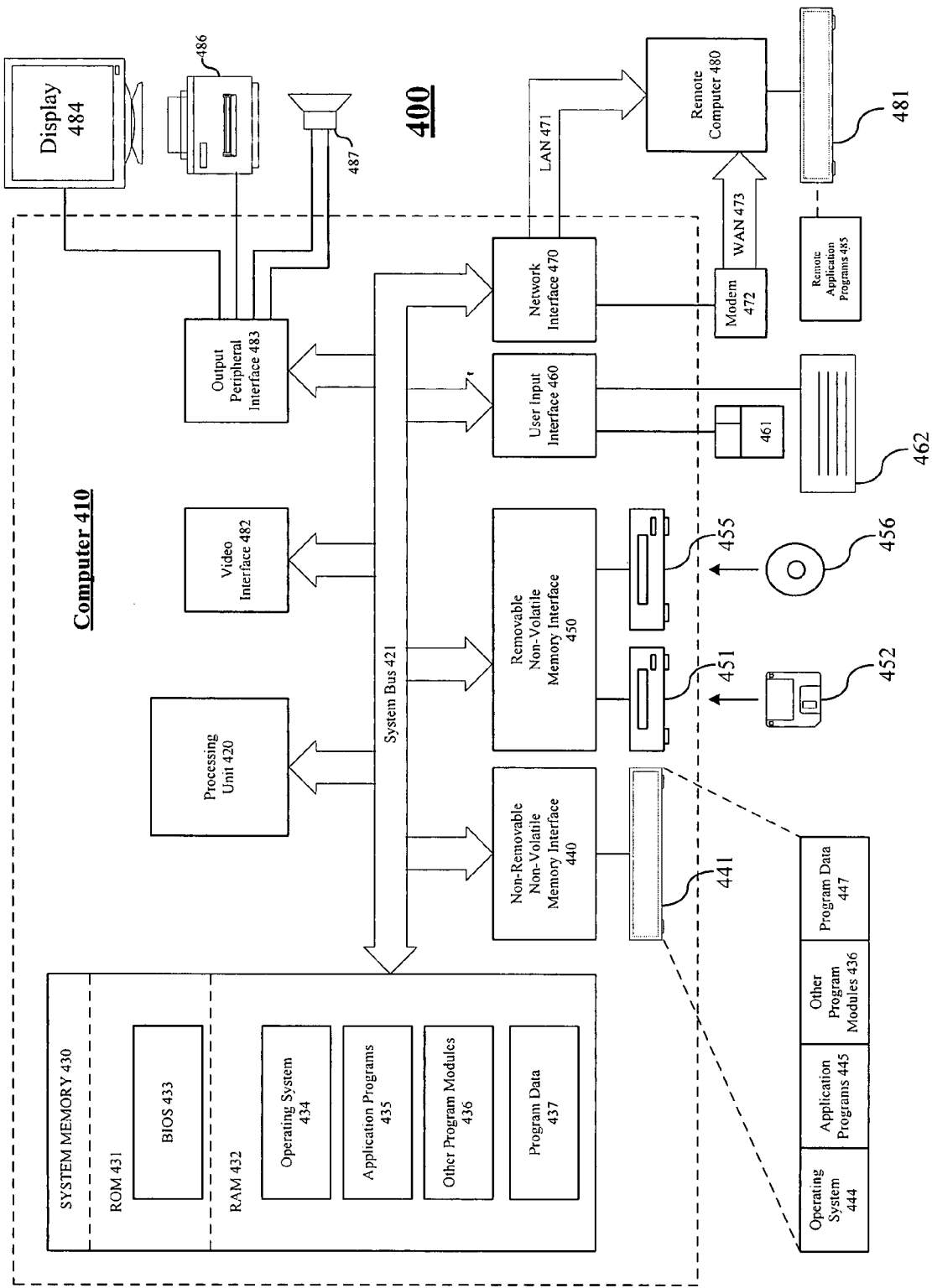
FIG. 4 illustrates one embodiment of a computing system architecture.

FIG. 4 illustrates a block diagram of a computing system architecture 400 suitable for implementing various embodiments, including the communication system 100. It may be appreciated that the computing system architecture 400 is only one example of a suitable computing environment and is not intended to suggest any limitation as to the scope of use or functionality of the embodiments. Neither should the computing system architecture 400 be interpreted as having any dependency or requirement relating to any one or combination of components illustrated in the exemplary computing system architecture 400.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 400 includes a general purpose computing device such as a computer 410. The computer 410 may include various components typically found in a computer or processing system. Some illustrative components of computer 410 may include, but are not limited to, a processing unit 420 and a memory unit 430.

In one embodiment, for example, the computer 410 may include one or more processing units 420. A processing unit 420 may comprise any hardware element or software element arranged to process information or data. Some examples of the processing unit 420 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 420 may be implemented as a general purpose processor. Alternatively, the processing unit 420 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 410 may include one or more memory units 430 coupled to the processing unit 420. A memory unit 430 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 410. The embodiments are not limited in this context.

In one embodiment, for example, the computer 410 may include a system bus 421 that couples various system components including the memory unit 430 to the processing unit 420. A system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 410 may include various types of storage media. Storage media may represent any storage media capable of storing data or information, such as volatile or non-volatile memory, removable or non-removable memory, erasable or non-erasable memory, writeable or re-writeable memory, and so forth. Computer readable media may include storage media adapted for reading and writing to a computing system, such as the computing system architecture 400. Examples of computer readable media for computing system architecture 400 may include, but are not limited to, volatile and/or nonvolatile memory such as ROM 431 and RAM 432. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 430 includes computer storage media in the form of volatile and/or non-volatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 484 or other type of display device is also connected to the system bus 421 via an interface, such as a video processing unit or interface 482. In addition to the monitor 484, computers may also include other peripheral output devices such as speakers 487 and printer 486, which may be connected through an output peripheral interface 483.

The computer 410 may operate in a networked environment using logical connections to one or more remote computers, such as a remote computer 480. The remote computer 480 may be a personal computer (PC), a server, a router, a network PC, a peer device or other common network node, and typically includes many or all of the elements described above relative to the computer 410, although only a memory storage device 481 has been illustrated in FIG. 4 for clarity. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other technique suitable for establishing communications over the WAN 473, such as the Internet. The modem 472, which may be internal or external, may be connected to the system bus 421 via the network interface 470, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other techniques for establishing a communications link between the computers may be used. Further, the network connections may be implemented as wired or wireless connections. In the latter case, the computing system architecture 400 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the computing system architecture 400 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multi-processor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   assigning a virtual network address to a device at a virtual network address assignment time, wherein the virtual network address does not directly correspond to a specific computing device;
   receiving a message arrival time for a message sent to the device having the virtual network address, the message arrival time representing a time when the message sent to the virtual network address is received by a message system;
   determining by a processor a virtual network address age value for the virtual network address with the virtual network address assignment time and the message arrival time; and
   determining whether to mark the message sent to the device having the virtual network address as spam based on the virtual network address age value by comparing the virtual network address age value to a Time To Live (TTL) value corresponding to the virtual network address as assigned to the device.

2. The method of claim 1, comprising sending the message to the device.

3. The method of claim 1, comprising processing the message based on a set of filter rules when the message is marked as spam.

4. The method of claim 1, comprising determining that the message is not spam and sending the message to the device when the virtual network address age value is less than the time to live value corresponding to the virtual network address.

5. The method of claim 1, comprising determining that the message is spam and discarding the message when the virtual network address age value is greater than the time to live value corresponding to the virtual network address.

6. The method of claim 1, comprising determining that the message is spam and discarding the message when the virtual network address age value is greater than the time to live value corresponding to the virtual network address by a threshold value.

7. The method of claim 1, comprising assigning a new virtual network address to the device from a block of virtual network addresses in accordance with a virtual network address rotation value.

8. The method of claim 1, comprising storing the virtual network address, a time to live value corresponding to the virtual network address, and the virtual network address assignment time in a virtual network address tracking table.

9. An article comprising a computer-readable storage medium containing instructions that if executed enable a system to:
   assign a virtual network address to a device at a virtual network address assignment time, wherein the virtual network address does not directly correspond to a specific computing device;
   receive a message arrival time for a message sent to the device having the virtual network address, the message arrival time representing a time when the message sent to the virtual network address is received by a message system;
   determine a virtual network address age value for the virtual network address with the virtual network address assignment time and the message arrival time; and
   determine whether to send the message, sent to the virtual network address assigned to the device, to the device based on the virtual network address age value by comparing the virtual network address age value to a Time To Live (TTL) value corresponding to the virtual network address as assigned to the device.

10. The article of claim 9, comprising instructions that if executed enable the system to retrieve the time to live value corresponding to the virtual network address.

11. The article of claim 9, comprising instructions that if executed enable the system to send the message to the device when the virtual network address age value is less than the time to live value corresponding to the virtual network address.

12. The article of claim 9, comprising instructions that if executed enable the system to process the message in accordance with a set of filter rules when the virtual network address age value is greater than the time to live value corresponding to the virtual network address.

13. The article of claim 9, comprising instructions that if executed enable the system to discard the message when the virtual network address age value is greater than the time to live value corresponding to the virtual network address by a threshold value.

14. The article of claim 9, comprising instructions that if executed enable the system to assign the virtual network address to the device from a block of virtual network addresses.

15. The article of claim 9, comprising instructions that if executed enable the system to assign a new virtual network address to the device from a block of virtual network addresses in accordance with a virtual network address rotation value.

16. An apparatus comprising:
    a processor,
    a virtual network address management module having a virtual network address assignment module,
    a virtual network address age generator and a message filter module, the virtual network address assignment module to assign a virtual network address to a device at a virtual network address assignment time, wherein the virtual network address does not directly correspond to a specific computing device, the virtual network address age generator to receive a message arrival time for a message sent to the device having the virtual network address, the message arrival time representing a time when the message sent to the device having the virtual network address is received by a message system and determine, by the processor, a virtual network address age value for the virtual network address with the virtual network address assignment time and the message arrival time, and the message filter module to determine whether to send the message, sent to the virtual network address assigned to the device, to the device based on the virtual network address age value by comparing the virtual network address age value to a Time To Live (TTL) value corresponding to the virtual network address as assigned to the device.

17. The apparatus of claim 16, comprising a virtual network address tracking table to store the virtual network address, the time to live value corresponding to the virtual network address, and the virtual network address assignment time.

18. The apparatus of claim 16, the virtual network address assignment module to derive the virtual network address assignment time from a message arrival time, a virtual network address block number and a virtual network address rotation value.

19. The apparatus of claim 16, the virtual network address assignment module to retrieve the virtual network address assignment time stored by a virtual network address tracking table.

20. The apparatus of claim 16, the message filter module to determine whether to send the message to the device based on the virtual network address age value and a set of filter rules.

* * * * *